United States Patent
Kundu et al.

(10) Patent No.: US 10,671,325 B2
(45) Date of Patent: Jun. 2, 2020

(54) SELECTIVE SECURE DELETION OF DATA IN DISTRIBUTED SYSTEMS AND CLOUD

(71) Applicant: INTERNATIONAL BUSINESS MACHINES CORPORATION, Armonk, NY (US)

(72) Inventors: Ashish Kundu, New York, NY (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 14/925,300

(22) Filed: Oct. 28, 2015

(65) Prior Publication Data

US 2017/0123671 A1    May 4, 2017

(51) Int. Cl.
G06F 3/06          (2006.01)
G06F 21/60         (2013.01)

(52) U.S. Cl.
CPC ............ *G06F 3/067* (2013.01); *G06F 3/0608* (2013.01); *G06F 3/0623* (2013.01); *G06F 3/0652* (2013.01); *G06F 21/60* (2013.01)

(58) Field of Classification Search
CPC ...... G06F 3/067; G06F 3/0608; G06F 3/0623; G06F 3/0652; G06F 21/60
USPC ......................................................... 711/100
See application file for complete search history.

(56) References Cited

U.S. PATENT DOCUMENTS

| 5,265,159 | A | 11/1993 | Kung |
| 6,070,174 | A | 5/2000 | Starek et al. |
| 6,496,949 | B1* | 12/2002 | Kanevsky ........... G06F 11/1456 340/3.3 |
| 7,246,209 | B2 | 7/2007 | Tran et al. |
| 7,275,139 | B1 | 9/2007 | Tormasov et al. |
| 7,507,911 | B2 | 3/2009 | Yoshida et al. |
| 7,831,560 | B1 | 11/2010 | Spertus et al. |
| 7,895,403 | B1* | 2/2011 | Tormasov ............. G06F 3/0623 711/154 |
| 8,056,143 | B2 | 11/2011 | Brown et al. |
| 8,495,296 | B2 | 7/2013 | Nagpal et al. |
| 9,003,546 | B2 | 4/2015 | Gross et al. |
| 9,470,670 | B2* | 10/2016 | Angeli ............... G01N 33/0067 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Hashem Farrokh
(74) *Attorney, Agent, or Firm* — Law Office of Jim Boice

(57) ABSTRACT

A processor-implemented method, system, and/or computer program product deletes data from a storage device. One or more processors identify a component sensitivity level of a component, an input sensitivity level of a data input to the component, and an output sensitivity level of a data output from the component, where the data output is stored in a storage device. The processor(s) average the component sensitivity level, the input sensitivity level, and the output sensitivity level to establish a composite sensitivity level, determine a deletion mode for deleting the output data from the storage device based on the composite sensitivity level, and delete the output data from the storage device by utilizing the deletion mode.

20 Claims, 8 Drawing Sheets

(56) References Cited

U.S. PATENT DOCUMENTS

| | | | | |
|---|---|---|---|---|
| 2010/0245087 | A1* | 9/2010 | Gerner | G07C 9/00111 340/541 |
| 2012/0210388 | A1* | 8/2012 | Kolishchak | G06F 21/552 726/1 |
| 2014/0046863 | A1* | 2/2014 | Gifford | G06Q 50/265 705/325 |
| 2015/0082022 | A1* | 3/2015 | Marinkovic | H04L 63/0442 713/153 |
| 2015/0101048 | A1* | 4/2015 | Sridhara | G06F 21/55 726/23 |
| 2015/0121537 | A1* | 4/2015 | Ellis | G06F 21/60 726/26 |
| 2015/0205954 | A1* | 7/2015 | Jou | G06F 21/316 726/22 |
| 2015/0256550 | A1* | 9/2015 | Taylor | H04L 67/18 726/23 |
| 2016/0371500 | A1* | 12/2016 | Huang | G06F 21/6245 |

OTHER PUBLICATIONS

Castiglione et al., "Automatic, Selective and Secure Deletion of Digital Evidence", IEEE, Broadband and Wireless Computing, Communication and Applications (BWCCA), 2011 International Conference on, 201, pp. 392-398.

Diesberg et al., "TrueErase: Per-File Secure Deletion for the Storage Data Path", ACM, Proceedings of the 28th Annual Computer Security Applications Conference, 2012, pp. 1-10.

Peterson et al., "Secure Delection for a Versioning File System", USENIX Association, 4th USENIX Conference on File and Storage Technologies, FAST'05, 2005, pp. 143-154.

Cachin et al., "Policy-Based Secure Deletion", ACM, Proceedings of the 2013 ACM SIGSAC Conference on Computer & Communications Security, 2013, pp. 259-270.

Tedesco et al., "Implementing Erasure Policies Using Taint Analysis", Springer, Information Security Technology for Applications, 15th Nordic Conference on Secure IT Systems, NordSec 2010, Espoo, Finland, Oct. 27-29, 2010, Revised Selected Papers, pp. 193-209.

Sivathani et al., "Life or Death at Block-Level", OSDI'04 Proceedings of the 6th Symposium on Operating Systems Design & Implementation, USENIX Association, Berkeley, CA, USA, 2004, pp. 1-16.

Diesburg, Sarah Marie, "Per-File Full-Data-Path Secure Deletion for Electronic Storage" (2012). Electronic Theses, Treatises and Dissertations. Paper 5342, pp. 1-134. <http://diginole.lib.fsu.edu/etd/5342>.

Burns et al., "Security Constructs for Regulatory-Compliant Storage", ACM, Communications of the ACM, vol. 53, No. 1, pp. 126-130 (Abstract Only).

* cited by examiner

SELECTIVE SECURE DELETION OF DATA IN DISTRIBUTED SYSTEMS AND CLOUD

BACKGROUND

The present disclosure relates to the field of computing resources, and specifically to storage devices used with computers. More specifically, the present disclosure relates to deleting data from storage devices in order to make the storage devices more secure and to free up space in the storage devices.

SUMMARY

A processor-implemented method, system, and/or computer program product deletes data from a storage device. One or more processors identify a component sensitivity level of a component, an input sensitivity level of a data input to the component, and an output sensitivity level of a data output from the component, where the data output is stored in a storage device. The processor(s) average the component sensitivity level, the input sensitivity level, and the output sensitivity level to establish a composite sensitivity level, determine a deletion mode for deleting the output data from the storage device based on the composite sensitivity level, and delete the output data from the storage device by utilizing the deletion mode.

DETAILED DESCRIPTION

Figure 1:
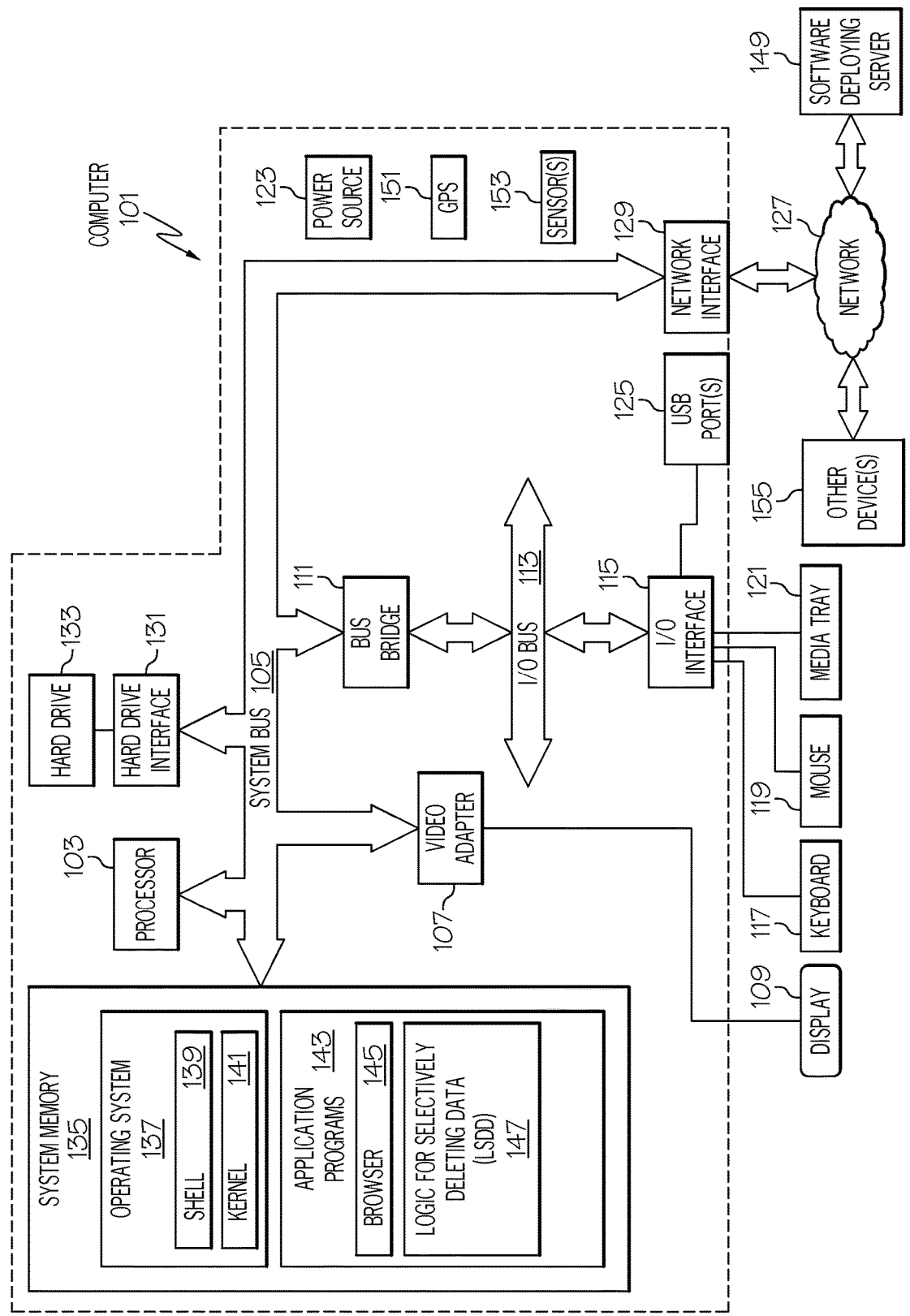
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other device(s) 155 shown in FIG. 1 and/or servers 1-4 introduced in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Selectively Deleting Data (LSDD) 147. LSDD 147 includes code for implementing the processes described below, including those described in FIGS. 2-5. In one embodiment, computer 101 is able to download LSDD 147 from software deploying server 149, including in an on-demand basis, wherein the code in LSDD 147 is not downloaded until needed for execution. In one embodiment of the present invention, software deploying server 149 performs all of the functions associated with the present invention (including execution of LSDD 147), thus freeing computer 101 from having to use its own internal computing resources to execute LSDD 147.

Also within computer 101 is a power source for powering computer 101. Power source 123 may be an essentially unlimited power source, such as that provided by a utility company, local generator, etc., or a limited power source, such as a battery.

Also within computer 101 is a positioning system, such as the depicted global positioning system (GPS) 151, which utilizes known positioning signals from satellites, etc. to establish the physical coordinate/address of computer 101 in real time.

Also within computer 101 are one or more sensors 153, which are hardware sensors capable of detecting conditions within and around computer 101. For example, one or more of the sensor(s) 153 may detect a level of usage of processor 103 (i.e., CPU usage), an amount of data traffic (i.e., bandwidth) on the system bus 105 and/or I/O bus 113, an internal temperature of a housing that holds computer 101, an amount of reads/writes going to and from hard drive 133, whether or not a lock on a storage cabinet that holds the computer 101 is locked, movement of the computer 101 (e.g., motion detectors such as accelerometers that are able to detect that the hard drive 133 is being carried by a person, is in the middle of an earthquake, etc.), etc. Furthermore, sensor(s) 153 may be able to detect an environment surrounding the computer 101, including but not limited to the presence of a person standing near the computer (e.g., using heat sensors, carbon dioxide monitors, cameras, etc.), temperatures outside of a housing that holds the computer (e.g., thermometers that detect a fire in the room), etc.

Other device(s) 155 are hardware devices, such as other computers, storage devices, sensors, etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

In accordance with one or more embodiments, the present invention addresses the problem of determining which units/blocks of sensitive data should be deleted (e.g., all, some, none, which ones?), as well as which secure deletion operation to apply (e.g., encryption, overwrite, multiple overwrites?), which deletion operation to apply to which blocks of data (e.g., a same deletion operation for all blocks, different deletion operations for different blocks, different deletion operations with multiple times/iterations for different blocks?), the cost of a secure deletion operation (in cost, time, resource usage), and the risk level posed by data and/or resources before/after data is deleted.

The problem of secure deletion in virtualized storage services depends on (1) the risk of data remanence (i.e., data fragments that remain after the data is "deleted"); (2) the cost of secure deletion (computational costs as well as physical wear and tear of storage media); and/or (3) throughput and latency of such data deletions, and their impact on managing free/dirty blocks.

It is not cost-effective to delete every block or unit of storage in a secure manner. For example, consider that a solution hosted on a cloud (i.e., a shared set of resources available on a wide area network) uses X blocks of storage. There are X0 storage units that may store data that are non-sensitive. There are X1 storage units that may store medium-sensitive data, whereas X2 units may store highly-sensitive data. In this scenario, it may be essential that the X1 blocks be applied with "secure deletion method(s)" (e.g., single overwrites, encryption, etc.) commensurate with the risk associated with the remanence (i.e., residual magnetism left on a hard drive) of medium-sensitive data. Similarly, the X2 blocks are applied with "secure deletion method(s)" that are stronger in terms of scrubbing the data and protecting from remanence of highly-sensitive data (e.g., multiple overwrites, physical degaussing or destruction of the storage medium holding the highly-sensitive data).

The present disclosure presents a method that addresses the problem of "selective secure deletion" (i.e., deleting data based on a selected type of deletion method). The presently-presented method differs significantly from prior methods for deleting/scrubbing data from storage devices in that the present method determines sensitivity of each storage unit and component dynamically, based on the ranks of other components that writes data to such a component, and deletes the data on each block according to the ranks, risk, cost and compliance requirements associated with the sensitivity rank.

Thus, the present invention dynamically determines a "sensitivity rank" of a block/file as well as a unit of storage. This determination uses an optimal set of steps for secure deletion of a storage volume based on sensitivity rank, risk of data remanence, cost of the types of secure deletion, number of times each such operation is to be applied, cost of wear and tear of each device, time required to delete/unit of storage, and other parameters, if any. This determination is then used to control how to delete data (i.e., which deletion method is to be used) from all storage mediums (local, virtualized) on a specific data flow path with different levels of secure deletion.

Thus, the method takes input as the data flow and the level of sensitivity for each unit of data that flows among components: data unit x of sensitivity level x_i flows into component j. Each component has a sensitivity level as well. The output of the component has the sensitivity level. The invention need not take any specification based on an orchestration language—the description of data flow and control flow may be in any manner as preferred by the system implementation.

In one or more embodiments, the present invention extends orchestration languages used to automate resource evaluations. Such orchestration languages may be container-centric (i.e., in which the sensitivity of particular volumes are evaluated), pure-play (i.e., in which the sensitivity of the components depend on a particular type of enterprise that uses the components/storage devices) or infrastructure-centric (i.e., in which the sensitivity of the components is based on the overall infrastructure of a system that includes user devices, storage devices, connecting networks, etc.). In any of these embodiments, the extended orchestration language identifies the sensitivity level of each of the components in a system, based on their features (e.g., type of software they run, what types of firewalls they have, what types of drives are used, whether storage is private or shared, whether or not they are accessible to a network such as the Internet, etc.) as well as the sensitivity of the data going into the component (e.g., is the data going in private and/or sensitive data) and coming out of the component (e.g., not only is the data coming out private and/or sensitive, but the structure of the data coming out may provide enough clues to indicate how the data was manipulated (e.g., using proprietary software) within the component).

Figure 2:
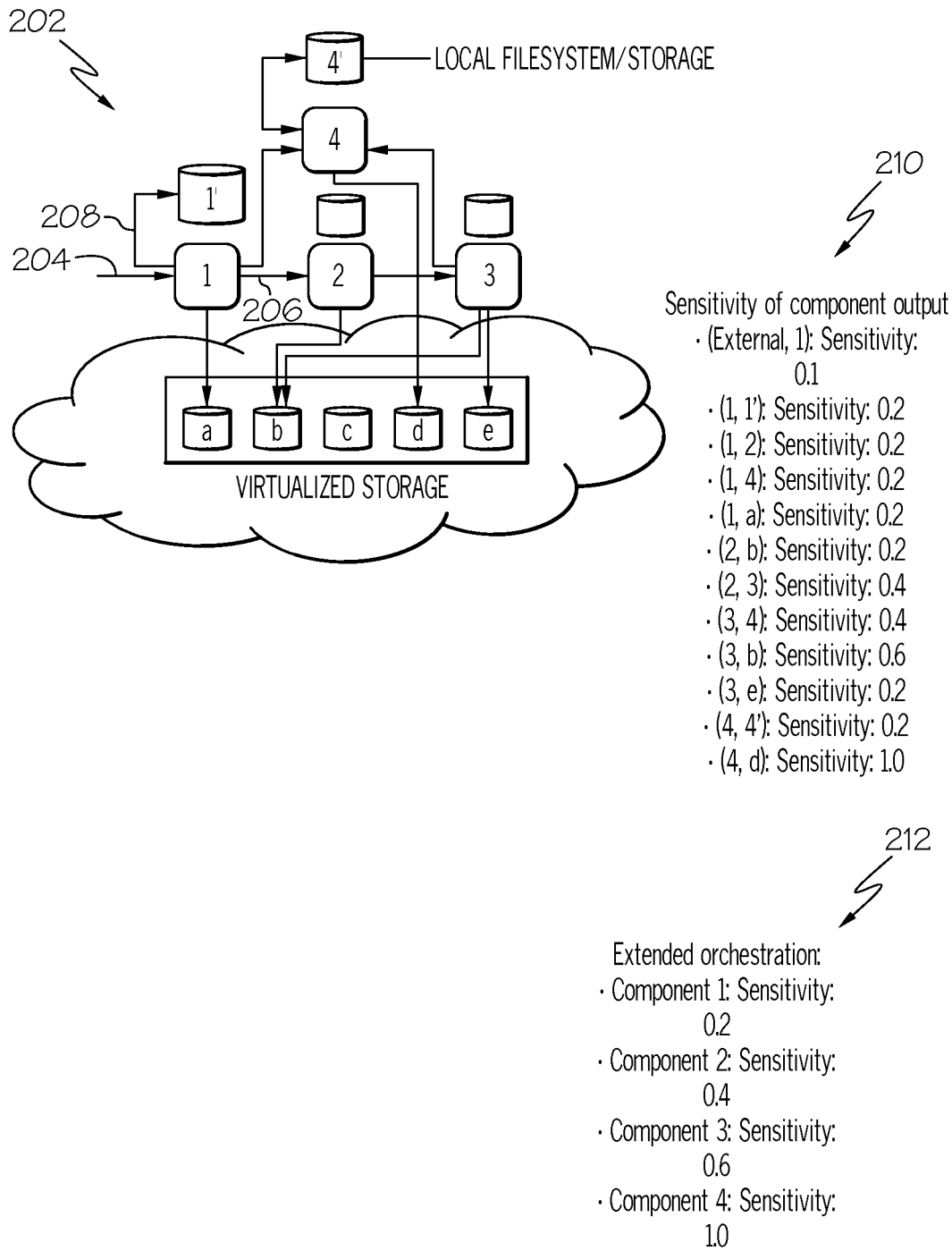
FIG. 2 illustrates sensitivity levels of various components, data inputs, and data outputs in a system according to one or more embodiments of the present invention.

With reference now to FIG. 2, consider infrastructure 202, which includes servers 1-4 and storage devices a-e and 1' and 4'.

The different servers have different sensitivity levels, as does the input going into and output coming out of the servers.

For example, assume that server 1 is a web server. As such, server 1 is not very sensitive, since it likely utilizes no proprietary technology for serving web pages, does not hold private and/or sensitive information (assuming that the web pages are traditional public web pages), etc. As such, server 1 itself is assigned a sensitivity rating of 0.2 (on a scale of 0.0 to 1.0, where 0.0 is the least sensitive level and 1.0 is the maximum sensitivity level).

Furthermore, the input data 204 going into the web server (e.g., requests for a particular web page) is not sensitive, nor is the output data 206 (e.g., a web page) coming out of the web server. Furthermore, when server 1 stores data (e.g., web pages) locally in a hard drive 1', this data (represented by line 208) is also not sensitive. Based on these determinations (e.g., made by an extended orchestration program) and as shown in listing 210, the sensitivity of input data from an external requester to server 1 is deemed to be 0.1. Data being stored locally (from server 1 to a local hard drive such as storage device 1') is deemed to have a sensitivity level of 0.2. Data being sent from server 1 to server 2 is deemed to have a sensitivity level of 0.2. Data being sent from server 1 to server 4 is deemed to have a sensitivity level of 0.2. Data being sent from server 1 to storage device a is deemed to have a sensitivity level of 0.2.

The extended orchestration language described above thus averages the sensitivity level of server 1 (0.2) along with the sensitivity of input data going into server 1 (0.1) and output data going to a local storage device 1' (0.1), server 2 (0.2), and server 4 (0.2) to arrive at an extended orchestration generated sensitivity value of 0.2 ((0.2+0.1+0.2+0.2+0.2)/5≈0.2) for operations involving server 1.

Thus, a sensitivity rank is a normalized floating point value between 0 and 1 (inclusive) that is established for each component (e.g., servers 1-4) based on a "sensitivity rank of each component" as well as a "Sensitivity rank of output" and/or a "Sensitivity rank of input" for each component.

Figure 3:
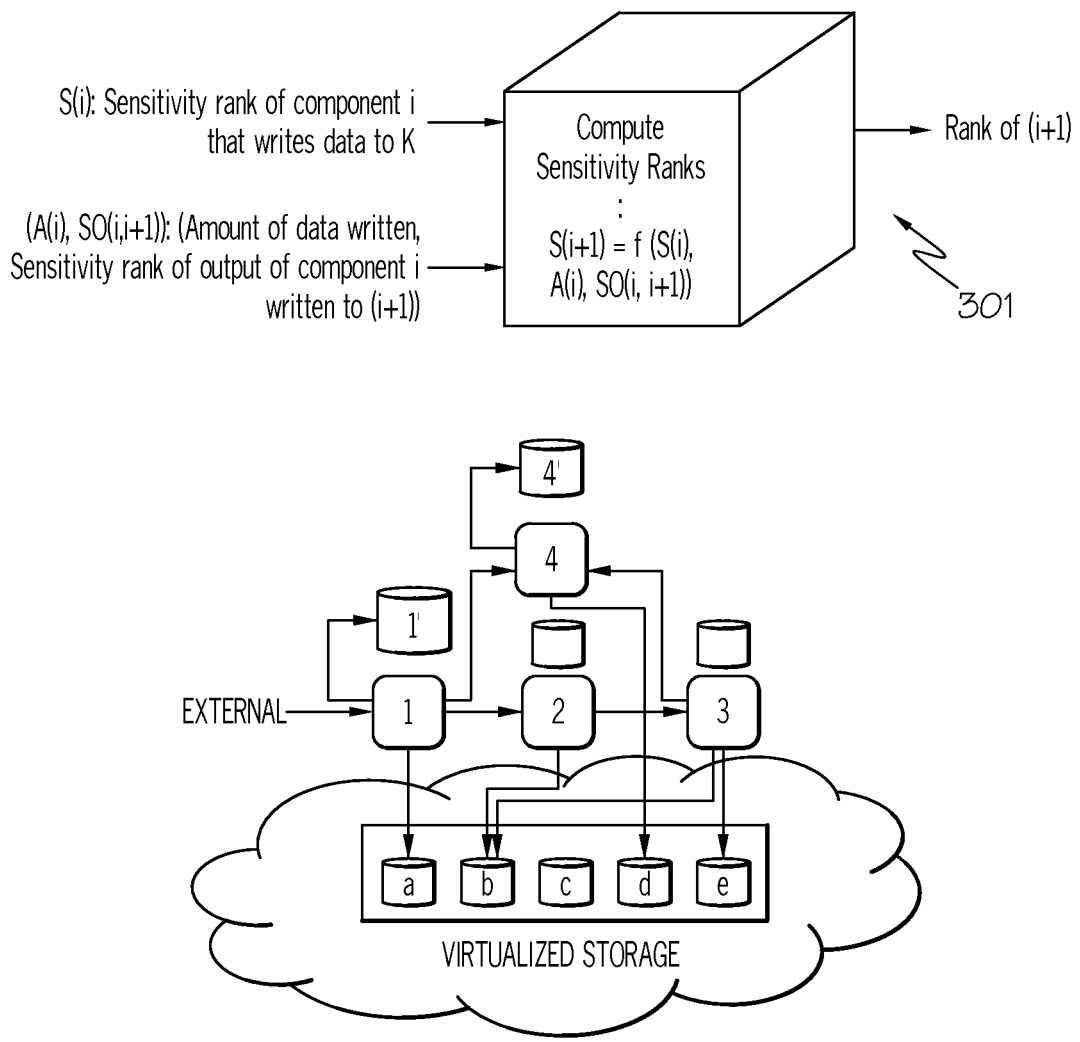
FIG. 3 depicts a ranking of components and data to determine a type of deletion to be used when deleting data from a storage device.
Figure 3:
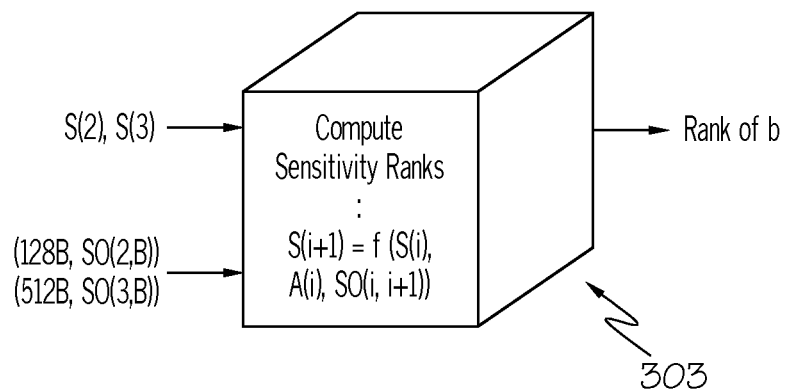

With reference now to FIG. 3, one or more embodiments of the present invention rank the components (servers 1-4) introduced in FIG. 2. A specification of the service annotated with an initial rank of sensitivity is assigned to each component and output from one component to another is described using an extended design specification language. For a service provisioned from this specification, dynamic sensitivity rank of each component (including storage blocks) is computed periodically or at a given request. The sensitivity rank of each component is computed from a recursive formulation and is solved using dynamic programming method (or any other technique as desired by the implementer).

For example, as shown in block 301, the recursive formulation may be as follows: $S(i+1)=f(S(i), A(i, i+1), SO(i, i+1))$, where $S(i)$ is the rank of component i, $A(i, i+1)$ is the amount of data of sensitivity rank $SO(i, i+1)$ transferred from "i" to "i+1". The function (f) is computed over all such source 'i' that sends data to sink (i+1). Once the sensitivity ranks of storage blocks are computed, how secure deletion is to be carried out is addressed. By using the sensitivity ranks, the risk of data remanence associated with each rank, the cost of each secure deletion primitive and the risk of each such primitive, the desired performance requirements as per QoS/SLA policies, and compliance policies, a sequence of "secure delete primitives and the number of times each such primitive to be applied for storage block 'i'" is computed, as described in block 303. This sequence of secure delete operations is then applied on the respective storage block 'i'.

If a snapshot/clone of the service is requested, one or more embodiments of the presently-presented method determines the sensitivity rank of each component as mentioned above, and updates these values in the annotated service specification.

Figure 4:
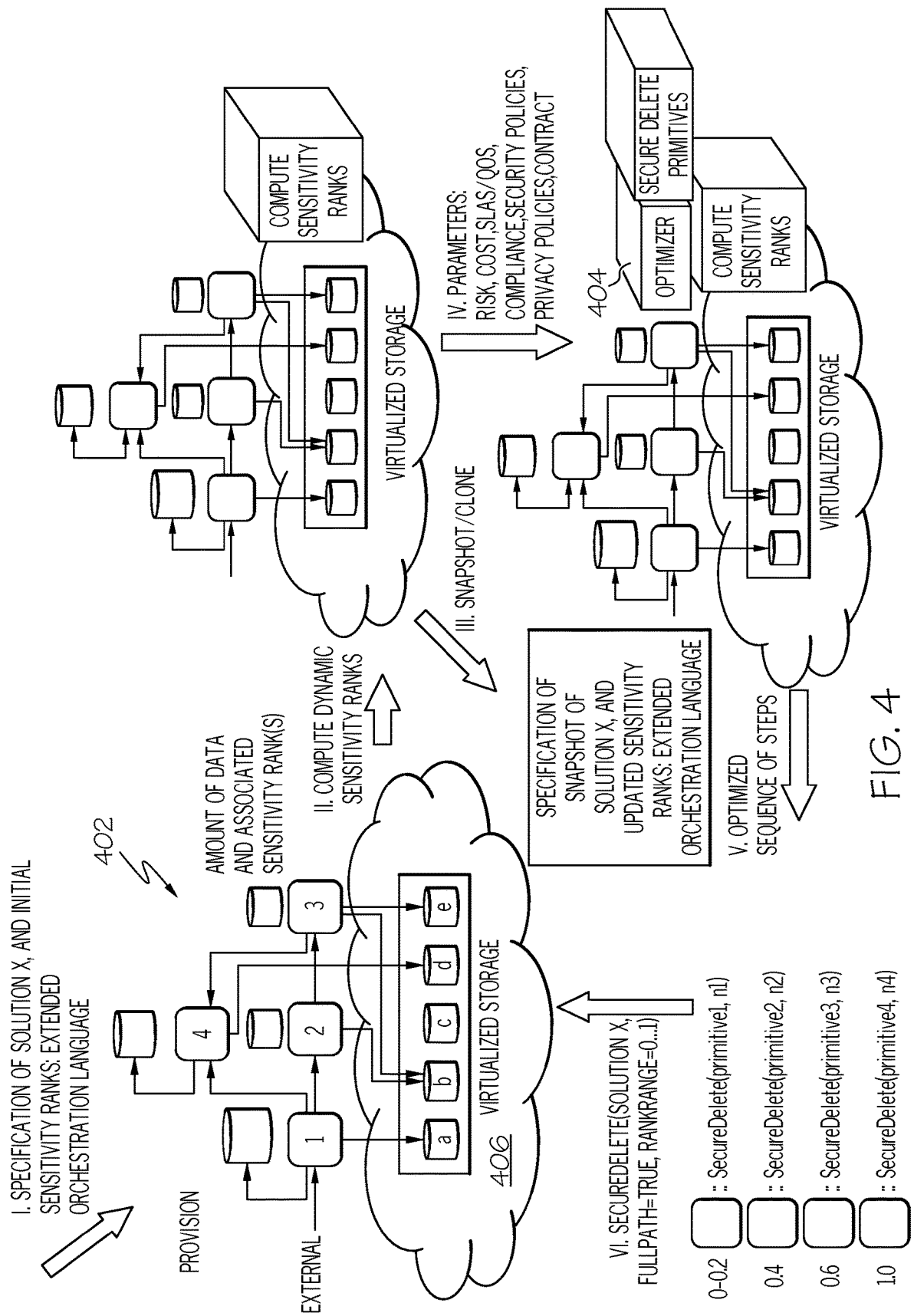
FIG. 4 illustrates a high-level overview of the present invention.

With reference now to FIG. 4, an overview of the present invention determining which type of data deletion to use is presented.

In step I, an initial sensitivity ranking for components (servers as well as storage devices) in system 402 is established using the extended orchestration language described above.

In step II, the components in the system 402 are re-ranked based on new data being processed. For example, if server 2 is a business systems server that initially only processed requests for information about products, then it may have an initial sensitivity level of 0.2. However, if it later started processing orders for such products (including credit card numbers, etc.) then it may have a higher sensitivity level (e.g., 0.4). Similarly, assume that server 3 initially calculated routines for processing dangerous chemicals, thus giving it a sensitivity level of 0.6. However, if it later took in input data used to calculate controls for producing inert materials, then its sensitivity level would drop (e.g., to 0.1). Similarly, assume that server 4 is a database server that initially processed credit card numbers, giving it a sensitivity level of 0.8. If it ceased storing credit card numbers (e.g., they were erased) and now only stores business addressed, then its sensitivity level would drop (e.g., to 0.0).

In step III, a snapshot/clone of the system 402 is generated. This snapshot not only includes a copy of what type of data deletion/scrubbing system should be used on each section of data ("Solution X"), but also a copy of the rankings of the components and/or their inputs/outputs.

In step IV, the system 402 is optimized in order to comply with service level agreements, legal requirements, etc. For example, an optimizer 404 may adjust the system 402 such that data is stored in storage device a instead of storage device b, assuming that storage device b is better equipped (based on its sensitivity rating) to handle this data.

In step V, the appropriate scrubbing method (primitive1-primitive4) for scrubbing/deleting data stored in storage devices a-e and/or other storage devices in system 402 is determined according to the derived sensitivity ratings.

In step VI, the appropriate scrubbing method(s) are applied to the storage devices, thus updating the state of the system 402.

As indicated in FIG. 4, some of the storage devices are virtual storage devices in a virtualized storage cloud 406. These virtual storage devices appear to be physical storage devices, but are actually virtual (e.g., software emulations of) storage devices that are supported by various sectors of storage devices located in a cloud of shared resources. Virtual storage devices are also referred to herein as virtual machines (VMs).

In accordance with one or more embodiments, the present invention minimizes cost, minimizes risk, maximizes performance of the system (thus improving the functioning of the overall system and/or specific components therein) while enabling secure deletion in elastic storage by performing the following steps.

Step 1. A security label and a policy p is assigned to each virtual storage device. "Policy p" specifies sensitivity levels of a "write" to a storage block based on sensitivity levels of data received or sent to another VM instance. The sensitivity levels may be based on temporal constraints (how much time is allowed for the data to be stored), "sensitivity escalation" and "sensitivity de-escalation" (i.e., where sensitivity levels change based on resource usage, as described above), thus leading to a sensitivity lattice.

Step 2. Processor(s) determine a sensitivity level for each storage block from the "writes" from VM instances and their sensitivity levels and a predefined "sensitivity lattice" for a block/volume. This is achieved by building a dynamic data-flow graph with each node (e.g., each node being a VM), such that each weighted directed edge from one VM to another specifies the flow of data. In one or more embodiments, the weighting is based on the level of sensitivity of data sent along with the amount of data sent. The sensitivity of an edge is computed from the sensitivity lattice. A taint-analysis (i.e., determining how sensitive each VM is) uses a page-rank type of analysis to determine ranks of each VM. In one or more embodiments, the ranking can be used as a multiplicative factor for sensitivity level of the VM.

Step 3. Let the cost of each level 'i' of "secure deletion" for each block/volume 'b' be "C(b, i)"—e.g., how much $$ or time? Thus, an $0^{th}$ level means—no deletion; and level k means the risk after deletion at level k is less than the risk of deletion at level (k−1), where k>=1.

Step 4. Let the degree of risk of each level 'i' of "secure deletion" for each block/volume 'b' be "R(b, i, x)"—e.g., how much would be the loss if data of size x stored in 'b' is exposed. Knowledge of the which users will gain access to a next block, or any time in the future, may reduce or increase risk level.

Step 5. Let the risk-composition function be RF (Risk-composition Function) that takes a set of risks as inputs and provides a risk aggregated out of the set as outputs.

Step 6. Let LR (Limit of Risk) be the limit on risk that must be met, such that the total risk out of a secure deletion must be less than or equal to LR. Let LC (Limit of Cost) be the limit on the cost of secure deletion.

Step 7. Before or upon receiving the instruction to "securely delete a set of blocks b1 . . . bk with LR and LC", determine a mapping of blocks with the levels of secure deletion.

Step 8. Apply deletions as per the output of Step 7 (i.e., which deletion/scrubbing process should be used).

Step 9. Create a schedule of deletion in order to minimize cost/delay due to deletion and delete data on blocks according to the schedule.

Step 10. Update the sensitivity level of each deleted blocks to 0 or to another level associated with the risk level associated with 'i' as declared in Step 5.

Step 11. If a block is going to be re-allocated to an instance that has the privileges to access the data on the block, then (1) If no need-to-know policy is enabled, then do not delete the data on the block; (2) If need-to-know policy is enabled, then delete the data on the block. If the block is not going to be reallocated, then data can be deleted using the process shown in steps 1-10, and/or the storage device can be destroyed (e.g., using degaussing, physical destruction, etc.).

Figure 5:
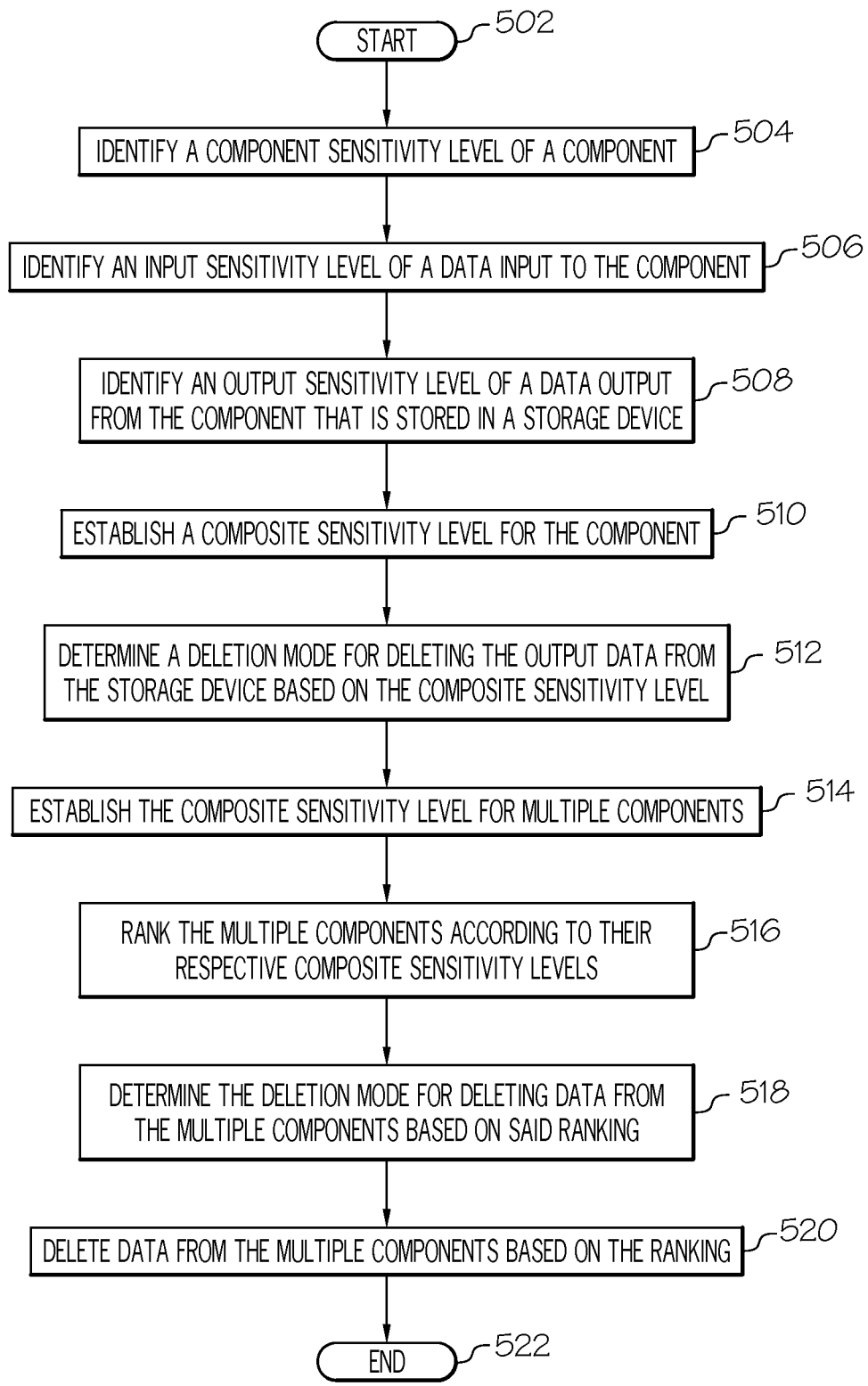
FIG. 5 is a high-level flow chart of steps performed by one or more processors and/or other hardware devices to delete data from a storage device.

With reference now to FIG. 5, a high-level flow chart of steps performed by one or more processors and/or other hardware devices to delete data from a storage device is presented.

After initiator block 502, one or more processors identify a component sensitivity level of a component, as depicted in block 504. For example, the sensitivity level of a server may be based on the type of software used by the server, which may be proprietary, the type of firewall protection and/or antivirus protection running on the server, etc.

As described in block 506, the processor(s) identify an input sensitivity level of a data input to the component. For example, the data coming into the server may be non-sensitive (e.g., a public address book) or sensitive (e.g., medical records).

As described in block 508, the processor(s) identify an output sensitivity level of a data output from the component, which is then (or alternatively, already has been) stored in a storage device. The output sensitivity level may be based not only on the content of the output data (e.g., social security numbers), but also the format of the data or other features, which can be used to determine what type of operations were used in the component. For example, assume that social security numbers were input into the component (highly sensitive), and names were output from the component (apparently not sensitive). However, by knowing the input and output to this component, a determination is obvious that the component has the ability to match a person to a social security number, thus making the output actually very sensitive if one were able to commandeer the component.

As described in block 510, the processor(s) average the component sensitivity level, the input sensitivity level, and the output sensitivity level to establish a composite sensitivity level. That is, the component sensitivity level, the input sensitivity level, and the output sensitivity level (weighted and/or un-weighted) are added together and divided by three, thus leading to the composite sensitivity level.

As described in block 512, the processor(s) determine a deletion mode for deleting the output data from the storage device based on the composite sensitivity level.

As described in block 514, the steps described in blocks 504-510 are reiterated for multiple components. As described in block 516, the processor(s) rank the multiple components according to their respective composite sensitivity levels, and then determine which deletion mode for deleting data from the multiple components should be used based on the ranking (block 518). As described in block 520, the processor(s) delete data from the multiple components based on the ranking.

The flow chart ends at terminator block 522.

In an embodiment of the present invention, wherein the storage device is a resource from a cloud of resources. In one scenario of this embodiment, one or more processors receive a request to store new data on the cloud of resources. In response to receiving the request to store data on the cloud of resources, the processor(s) delete the output data from the storage device according to the deletion mode before permitting the storage device to store the new data. Thus, only properly scrubbed storage devices are allowed to accept new data for storage on the cloud.

In an embodiment of the present invention, one or more processors adjust the input sensitivity level of the data input to the component based on a size of the data input. For example, if a large amount of data is being input to a server, then it may be deemed to be more sensitive than if only a relatively smaller amount of data were to be input to the server, since there is a higher chance that at least some of the input data is sensitive. Similarly, the size of the data output may determine how sensitive it is.

In an embodiment of the present invention, the sensitivity level of the component (e.g., a server) is based on sensor readings (e.g., from sensor(s) 153 shown in FIG. 1). For example, assume that the sensors on the server detect that the server is being moved, or that a person is next to the server, or that CPU usage is above nominal parameters, etc. This leads to a conclusion that the sensitivity level of that server has increased, based on the received sensor readings. Thus, in this embodiment one or more processors receive a sensor reading from a sensor in the component (where the sensor reading describes an operational state of the component), and then adjust the component sensitivity level based on the sensor reading.

In an embodiment of the present invention, the sensitivity level of the component (e.g., a server) is based on where it is located. For example, if a server has been moved from a highly secure locked room to an unsecure unlocked room, it will have a higher sensitivity level due to being less trustworthy. Thus, in this embodiment one or more processors receive a positioning reading from a positioning sensor (e.g., GPS positioning system 151 shown in FIG. 1) in the component (where the positioning sensor reading identifies a current physical location of the component), and then adjust the component sensitivity level based on the positioning reading.

In various embodiments of the present invention, the type of deletion/scrubbing process is based on the composite sensitivity level described herein. For example, if the composite sensitivity level is fairly low (e.g., between 0.0 and 0.2), then a single pass overwrite may be sufficient (in which a single bit from each byte in the stored data is randomly replaced with a 0 or 1). However, if the composite sensitivity level is high (e.g., between 0.4 and 0.6), then a multi-pass overwriting (in which multiple bits are randomly replaced with zeros or ones) may be required.

However, if the composite sensitivity level is very high (e.g., between 0.8 and 1.0), then the storage device may be degaussed (e.g., magnetically erased, which renders the storage device useless since operational information also gets erased) or physically destroyed (e.g., mechanically crushed).

Another option for scenarios in which the composite sensitivity level is very high is to encrypt the output data being stored. That is, the stored data is read, encrypted, and the restored back on the storage device. However, in order to ensure that the data cannot be read later, the decryption key is destroyed and/or never created. For example, assume that the stored data is encrypted using an asymmetric key encryption scheme, which a public key to encrypt the output data and a private key to decrypt encrypted output data. However, if the private key is never created (or is destroyed), then the output data cannot be decrypted, thus effectively scrubbing the stored data off of the storage device.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
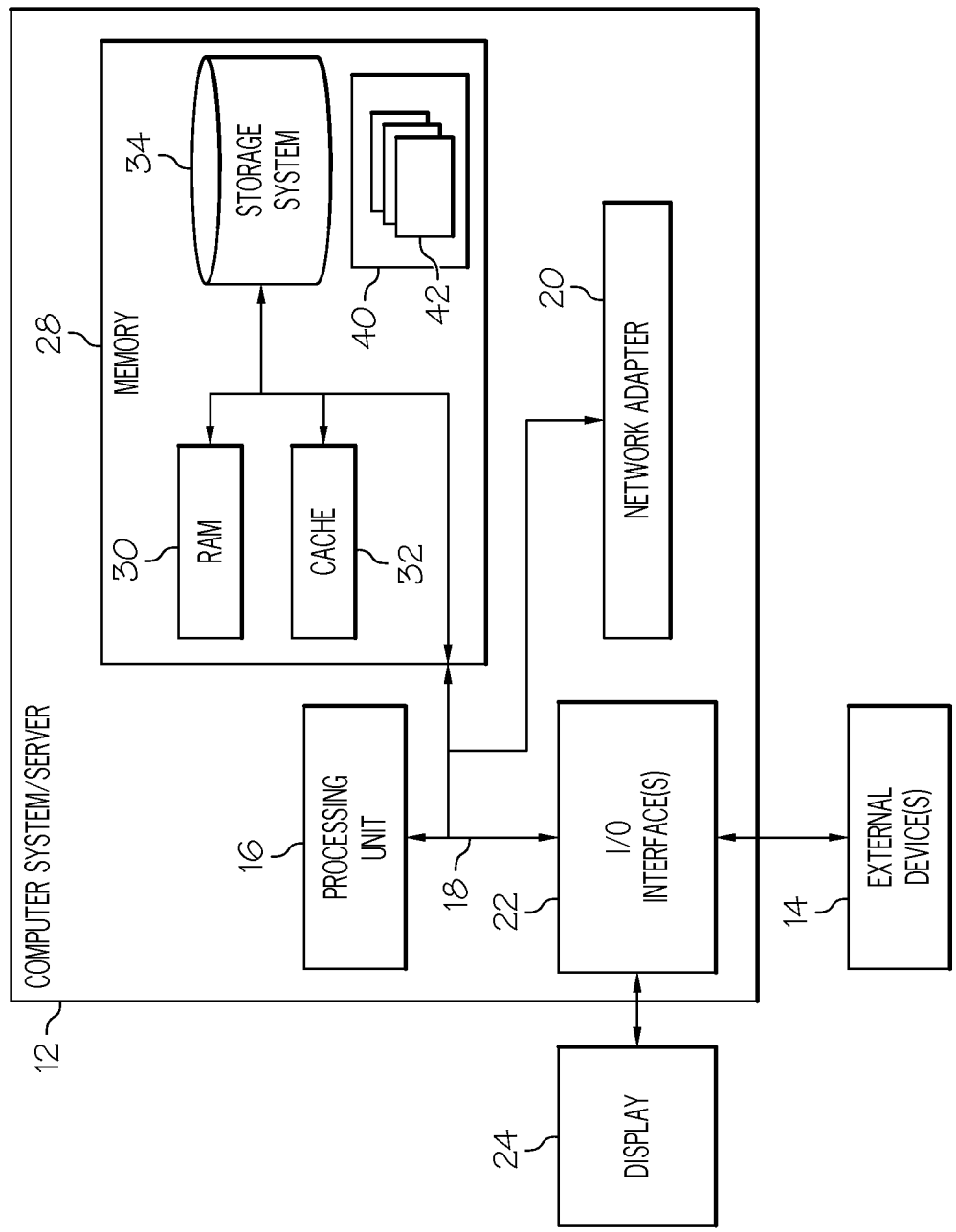
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
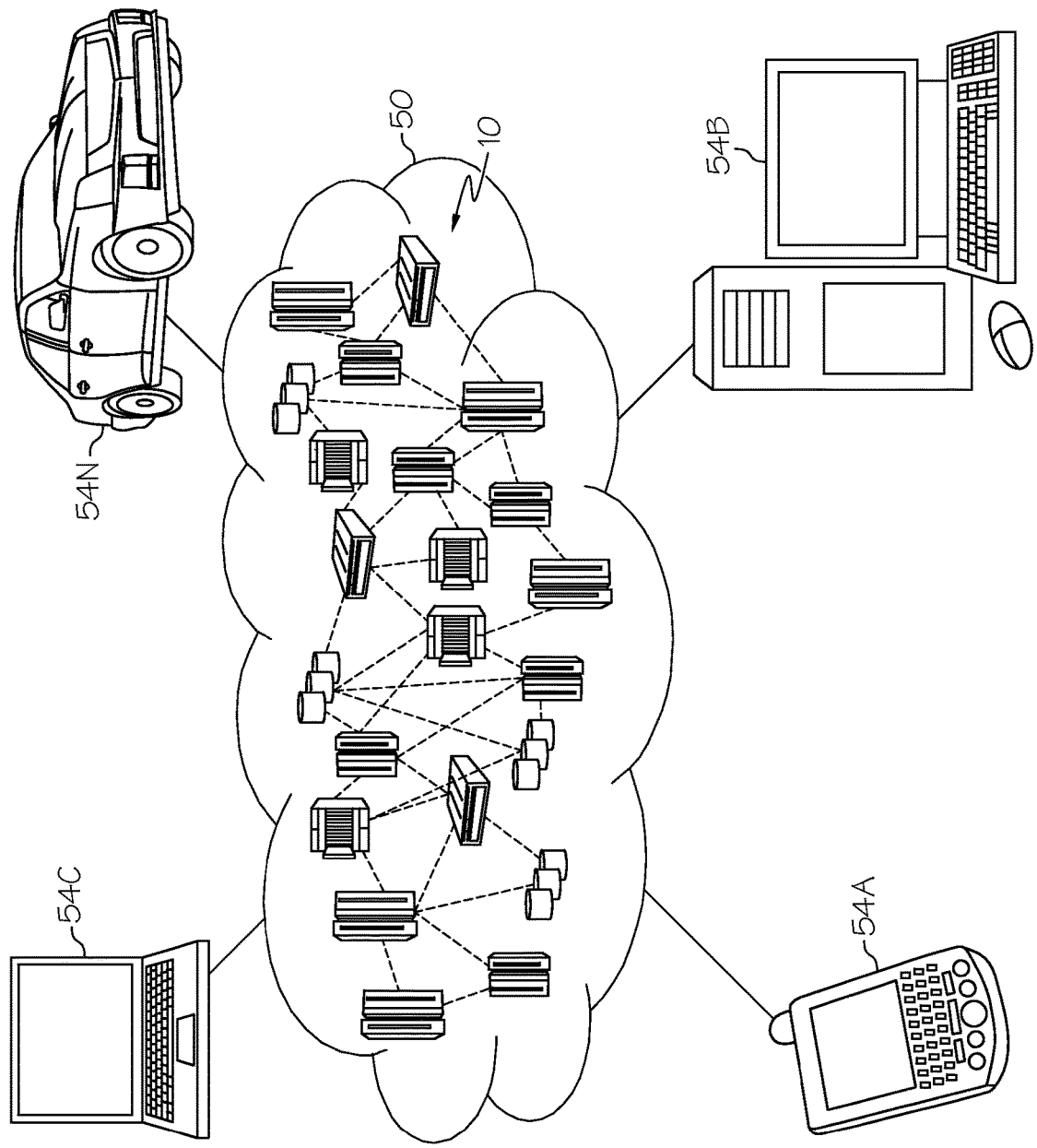
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 7 are intended to be illustrative only and that computing nodes 10 and cloud computing environment 50 can communicate with any type of computerized device over any type of network and/or network addressable connection (e.g., using a web browser).

Figure 8:
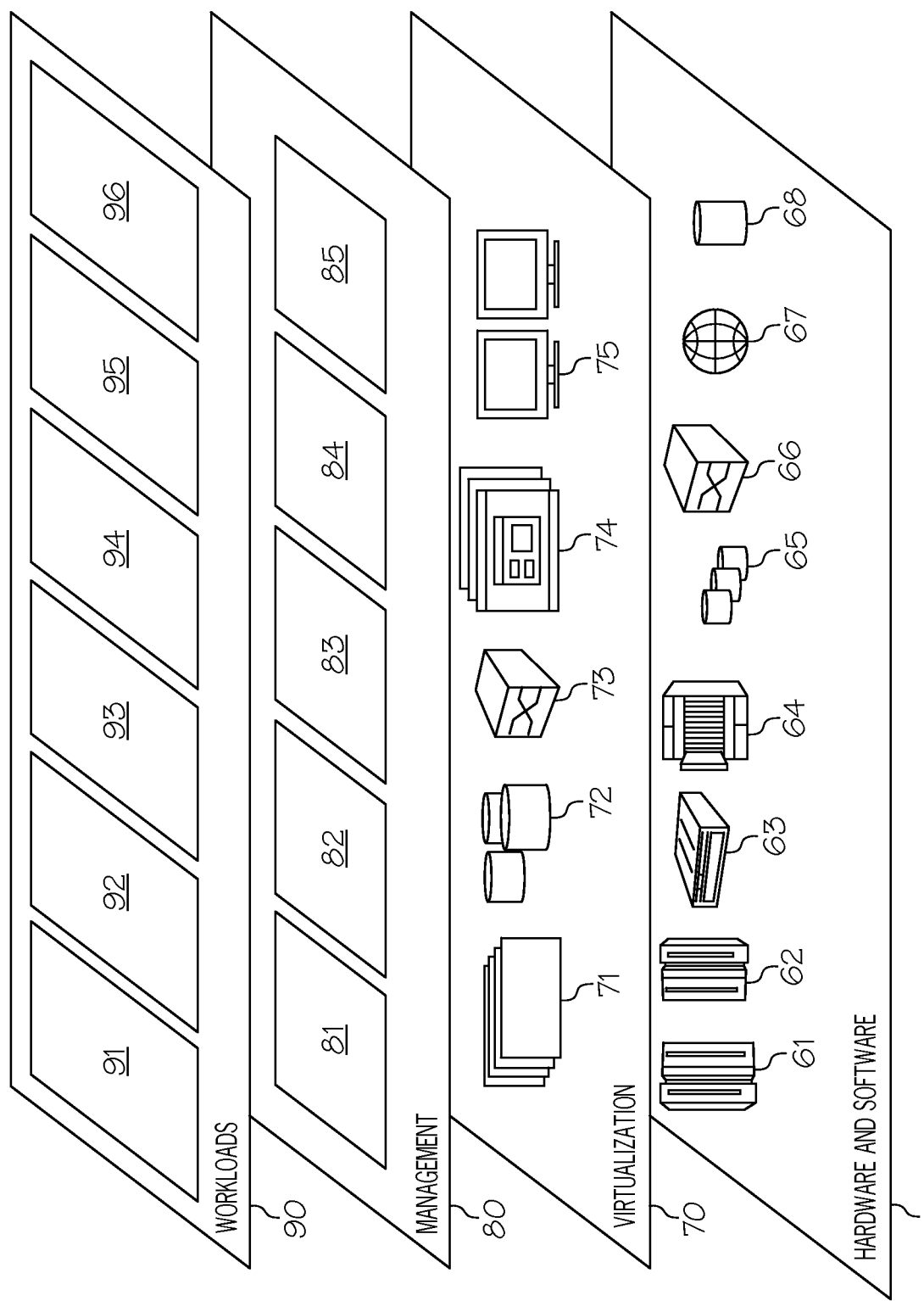
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data deletion processing 96 (for deleting data from a storage device as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:
1. A processor-implemented method comprising:
identifying, by one or more processors, a component sensitivity level of a server in an infrastructure, wherein the component sensitivity level describes a level of exposure to a malicious attack against the server;
identifying, by one or more processors, an input sensitivity level of a data input to the server;
identifying, by one or more processors, an output sensitivity level of a data output from the server, wherein the data output is created by the server executing a processing operation, and wherein the data output is stored in a storage device that is external to the server;
averaging, by one or more processors, the component sensitivity level, the input sensitivity level, and the output sensitivity level to establish a composite sensitivity level;
determining, by one or more processors, a deletion mode for deleting the output data, which came from the server, from the storage device based on the composite sensitivity level; and
deleting, by one or more processors, the output data, which came from the server, from the storage device by utilizing the deletion mode.
2. The processor-implemented method of claim 1, further comprising:
establishing, by one or more processors, the composite sensitivity level for multiple components of the infra- structure, wherein the multiple components are from a group of components consisting of servers and storage devices;

ranking, by one or more processors, the multiple components according to their respective composite sensitivity levels;

determining, by one or more processors, the deletion mode for deleting data from the multiple components based on the ranking; and deleting, by one or more processors, data from the multiple components based on the ranking.

3. The processor-implemented method of claim 1, wherein the storage device is a resource from a cloud of resources, and wherein the processor-implemented method further comprises:

receiving, by one or more processors, a request to store new data on the cloud of resources; and in response to receiving the request to store the new data on the cloud of resources, deleting, by one or more processors, the output data from the storage device according to the deletion mode before permitting the storage device to store the new data.

4. The processor-implemented method of claim 1, further comprising:

adjusting, by one or more processors, the input sensitivity level of the data input to the server based on a size of the data input, wherein a large data input is deemed to be more sensitive than a small data input that is smaller than the large data input, wherein the large data input has a higher chance of being sensitive than the small data input due to a size of the large data input as compared to a size of the small data input, and wherein the input sensitivity level of the large data input is adjusted to be higher than the input sensitivity level of the small data input.

5. The processor-implemented method of claim 1, further comprising:

adjusting, by one or more processors, the output sensitivity level of the data output from the server based on a size of the data output, wherein a large data output is deemed to be more sensitive than a small data output that is smaller than the large data output, wherein the large data output has a higher chance of being sensitive than the small data output due to a size of the large data output as compared to a size of the small data output, and wherein the output sensitivity level of the large data output is adjusted to be higher than the output sensitivity level of the small data output.

6. The processor-implemented method of claim 1, further comprising:

receiving, by one or more processors, a sensor reading from a sensor in a component of the infrastructure, wherein the component is from a group of components consisting of servers and storage devices, wherein the sensor reading describes an operational state of the component; and adjusting, by one or more processors, a component sensitivity level of the based on the sensor reading.

7. The processor-implemented method of claim 1, further comprising:

receiving, by one or more processors, a positioning reading from a positioning sensor in a component of the infrastructure, wherein the component is from a group of components consisting of servers and storage devices, wherein the positioning sensor reading identifies a current physical location of the component; and adjusting, by one or more processors, a component sensitivity level of the based on the positioning reading.

8. The processor-implemented method of claim 1, further comprising:

in response to the composite sensitivity level being between a first predetermined value and a second predetermined value, deleting, by one or more processors, the output data stored on the storage device by single-pass overwriting the output data that is stored on the storage device.

9. The processor-implemented method of claim 1, further comprising:

in response to the composite sensitivity level being between a first predetermined value and a second predetermined value, deleting, by one or more processors, the output data stored on the storage device by multi-pass overwriting the output data that is stored on the storage device.

10. The processor-implemented method of claim 1, further comprising:

in response to the composite sensitivity level being between a first predetermined value and a second predetermined value, deleting, by one or more processors, the output data stored on the storage device by encrypting the output data that is stored on the storage device, wherein said encrypting uses an asymmetric key encryption scheme that uses a public key to encrypt the output data and a private key to decrypt encrypted output data, and wherein the private key is never created such that the output data cannot be decrypted.

11. The processor-implemented method of claim 1, further comprising:

detecting, by a thermometer that senses a temperature within a housing that holds the server, an increase in the temperature within the housing beyond a predefined limit; and in response to detecting the increase in the temperature within the housing beyond the predefined limit, increasing, by one or more processors, the component sensitivity level of the server.

12. The processor-implemented method of claim 1, further comprising:

detecting, by a motion detector in the server, an occurrence of an earthquake at a location of the server; and in response to the motion detector detecting the occurrence of the earthquake at the location of the server, increasing the component sensitivity level of the server.

13. The processor-implemented method of claim 1, wherein the server is initially calculating routines for processing a dangerous chemical that is known to be hazardous, wherein the server is also capable of calculating controls for producing an inert material that is known to be nonhazardous, and wherein the processor-implemented method further comprises:

determining, by one or more processors, that the server has switched from calculating the routines for processing the dangerous chemical to calculating the controls for producing the inert material; and in response to determining that the server has switched from calculating the routines for processing the dangerous chemical to calculating the controls for producing the inert material, lowering the component sensitivity level of the server.

14. The processor-implemented method of claim 1, wherein the data input is a single data input having the input sensitivity level, wherein the data output is multiple data outputs from the server to different components of the infrastructure, wherein each of the multiple data outputs have the output sensitivity level, wherein the input sensitivity level and the output sensitivity level are different levels, and wherein the processor-implemented method further comprises:
    averaging, by one or more processors, the component sensitivity level, the input sensitivity level, and the output sensitivity levels from each of the multiple data outputs to establish a new value of the composite sensitivity level, wherein the output sensitivity levels from each of the multiple data outputs have a greater impact on the composite sensitivity level than either the component sensitivity level or the input sensitivity level.

15. The processor-implemented method of claim 1, wherein the data input to the server is sensitive data, wherein the data output from the server is initially not sensitive data, wherein correlating the data output from the server with the data input to the server makes the data output from the server a sensitive data output, and wherein the processor-implemented method further comprises:
    correlating, by the server, the data output with the data input;
    generating, by one or more processors, a new output sensitivity level for the data output that is correlated with the data input to become the sensitive data output; and
    reestablishing, by one or more processors, the composite sensitivity level using the new output sensitivity level.

16. The processor-implemented method of claim 1, wherein the component sensitivity level is based on a particular type of enterprise that uses the server.

17. The processor-implemented method of claim 1, further comprising:
    determining, by one or more processors, a presence of a person next to the server; and
    identifying, by one or more processors, the component sensitivity level of the server, wherein the component sensitivity level describes the level of exposure to the malicious attack against the server based on the presence of the person next to the server.

18. The processor-implemented method of claim 1, further comprising:
    detecting, by a carbon dioxide monitor near the server, that a level of carbon dioxide near the server is more than a predetermined level of carbon dioxide;
    in response to the carbon dioxide monitor detecting that the level of carbon dioxide near the server is more than the predetermined level of carbon dioxide, ascertaining, by one or more processors, a presence of a person next to the server; and
    identifying, by one or more processors, the component sensitivity level of the server, wherein the component sensitivity level describes a level of exposure to a malicious attack against the server based on the presence of the person next to the server.

19. A computer program product for deleting data from a storage device, the computer program product comprising a non-transitory computer readable storage medium having program code embodied therewith, the program code readable and executable by a processor to perform a method comprising:
    identifying a component sensitivity level of a server in an infrastructure, wherein the component sensitivity level describes a level of exposure to a malicious attack against the server;
    identifying an input sensitivity level of a data input to the server;
    identifying an output sensitivity level of a data output from the server, wherein the data output is created by the server executing a processing operation, and wherein the data output is stored in the storage device that is external to the server;
    averaging the component sensitivity level, the input sensitivity level, and the output sensitivity level to establish a composite sensitivity level;
    determining a deletion mode for deleting the output data, which came from the server, from the storage device based on the composite sensitivity level; and
    deleting the output data, which came from the server, from the storage device by utilizing the deletion mode.

20. A computer system comprising:
    a processor, a computer readable memory, and a non-transitory computer readable storage medium;
    first program instructions to identify a component sensitivity level of a server in an infrastructure, wherein the component sensitivity level describes a level of exposure to a malicious attack against the server;
    second program instructions to identify an input sensitivity level of a data input to the server;
    third program instructions to identify an output sensitivity level of a data output from the server, wherein the data output is created by the server executing a processing operation, and wherein the data output is stored in a storage device that is external to the server;
    fourth program instructions to average the component sensitivity level, the input sensitivity level, and the output sensitivity level to establish a composite sensitivity level;
    fifth program instructions to determine a deletion mode for deleting the output data, which came from the server, from the storage device based on the composite sensitivity level;
    sixth program instructions to delete the output data, which came from the server, from the storage device by utilizing the deletion mode;
    seventh program instructions to establish the composite sensitivity level for multiple components of the infrastructure, wherein the multiple components are from a group of components consisting of servers and storage devices;
    eighth program instructions to rank the multiple components according to their respective composite sensitivity levels;
    ninth program instructions to determine the deletion mode for deleting data from the multiple components based on the ranking;
    tenth program instructions to receive a request to store new data on a cloud of resources, wherein the storage device is a resource on the cloud of resources; and
    eleventh program instructions to, in response to receiving the request to store the new data on the cloud of resources, delete the output data from the storage device according to the deletion mode before permitting the storage device to store the new data; and
    wherein the first, second, third, fourth, fifth, sixth, seventh, eighth, ninth, tenth, and eleventh program instructions are stored on the non-transitory computer readable storage medium for execution by one or more processors via the computer readable memory.

\* \* \* \* \*